United States Patent [19]

Foley

[11] Patent Number: 5,526,040
[45] Date of Patent: Jun. 11, 1996

[54] SIGNAL PROCESSING APPARATUS FOR A PHOTOGRAPHIC FILM SCANNER

[75] Inventor: Walter D. Foley, Rochester, N.Y.

[73] Assignee: Eastman Kodak Company, Rochester, N.Y.

[21] Appl. No.: 303,550

[22] Filed: Sep. 9, 1994

Related U.S. Application Data

[63] Continuation of Ser. No. 85,523, Jun. 30, 1993, abandoned.

[51] Int. Cl.$^6$ .......................... H04N 3/36; H04N 5/253; H04N 9/11; H04N 9/47
[52] U.S. Cl. .................................. 348/97; 348/96
[58] Field of Search .................. 348/96, 97, 98, 348/100, 102, 104, 110, 112; H04N 5/253

[56] References Cited

U.S. PATENT DOCUMENTS

| | | | |
|---|---|---|---|
| 4,418,358 | 11/1983 | Poetsch et al. | 348/96 |
| 4,492,458 | 1/1985 | Bickl et al. | 355/38 |
| 4,523,231 | 6/1985 | Therrien | 358/139 |
| 4,666,307 | 5/1987 | Matsumoto et al. | 356/404 |
| 4,680,638 | 7/1987 | Childs | 358/214 |
| 4,712,089 | 12/1987 | Verber | 340/347 |
| 4,903,131 | 2/1990 | Lingemann et al. | 358/214 |
| 5,038,216 | 8/1991 | Easterly et al. | 358/228 |
| 5,046,158 | 9/1991 | Groen | 341/137 |
| 5,179,581 | 1/1993 | Annis | 348/209 |
| 5,278,653 | 1/1994 | Mead | 358/160 |
| 5,327,247 | 7/1994 | Osbourne, et al. | 348/100 |
| 5,467,412 | 11/1995 | Capitant et al. | 348/97 |

*Primary Examiner*—Wendy R. Greening
*Assistant Examiner*—Bipin Shalwala
*Attorney, Agent, or Firm*—Francis H. Boos, Jr.

[57] ABSTRACT

In a digital film scanner, invalid image pixel data is identified by a logic circuit which responds jointly to an over range signal from the scanner analog to digital converter and the most significant bit of the pixel data. The logic circuit discriminates between input pixel analog voltages representing valid maximum or minimum pixel data values and values which are outside the conversion range of the A/D converter which correspond to invalid pixel data. An image processing computer selectively responds to these indications to substitute nearby valid pixel data for calculation and to provide appropriate operator warnings or even system shutdown depending on the number of successive invalid pixel data occurrences.

4 Claims, 2 Drawing Sheets

SIGNAL PROCESSING APPARATUS FOR A PHOTOGRAPHIC FILM SCANNER

This is a continuation of application Ser. No. 085,523, filed June 30, 1993 now abandoned.

FIELD OF THE INVENTION

This invention relates to the field of photographic printer systems and more specifically to signal processing apparatus used to calculate print exposure conditions from film image scan data.

BACKGROUND

It is well known in the photographic printer art to employ a film image scanner to derive signals representative of film image density on a pixel-by-pixel basis. These signals are used in an image processing computer as inputs to one or more exposure determination algorithms for derivation of control signals used to control exposure of the film image to photographic print paper at the printer station. If the image scanner is of sufficiently high resolution, the image pixel signals may be used in a digital printer for direct hardcopy print reproduction of the image, usually after some appropriate manipulation of the image pixel signals in an image processing computer. Generally, one or more analog-to-digital (A/D) converters are used to convert the analog value image pixel signals from the scanner into digital values usable in the image processing computer for the necessary calculations or signal manipulation.

In normal operation of an A/D converter, all data bits of the digital output signal are set "high" if the input analog voltage is equal to the positive voltage reference of the converter. Similarly, all output data bits are set "low" if the analog input voltage is equal to the negative voltage reference. The same would be true if the input analog signal values were outside the conversion range of the A/D converter. That is to say, a failure mode of the scanner or a scratch or piece of dust on the film could cause the analog value of the input signal to be outside the A/D conversion range but the output data bits would all be "high" or "low", the same as if the input analog value were equal to the corresponding reference voltage which determines limit of the conversion range. This means that invalid data could be used unknowingly in the image processing computer to produce improper exposure determination results or to incorrectly represent the scanned image pixel values in a digital printing system.

It is therefore desirable to provide signal processing apparatus for a photographic scanning system that recognizes the existence of invalid data and takes appropriate action in the imaging processing computer to account for the invalid data.

SUMMARY OF THE INVENTION

Thus in accordance with the invention, signal processing apparatus for a photographic film scanner having a sensor for deriving analog signals from successive pixels of an image scan and having an analog-to-digital converter for converting the analog signals into digital information wherein the digital information is comprised of (a) an image pixel data set representative of the analog signal value, the data set having a most significant bit position, and (b) an over-range signal representative of the existence of an analog signal value that is outside the conversion range of the analog-to-digital converter bounded by an under limit value and an over limit value. According to the invention, the signal processing apparatus characterized by the inclusion of a logic circuit which is responsive to the most significant bit position of the data set and to the over-range signal for generating a first logic condition indicative of an analog value lower than the under limit value of the conversion range and a second logic condition indicative of an analog value higher than the over limit value of the conversion range and by the provision of an image processing computer adapted to be responsive to the logic conditions for processing the image pixel data sets in a predetermined manner depending on the logic condition indication for each corresponding image pixel data set.

It will be appreciated that with signal processing apparatus of the invention, it becomes possible for the image processing computer to recognize the existence of invalid data and to take appropriate action. For example, depending on the number of successive occurrences of the invalid data, the computer may ignore the invalid data and use data from the nearest pixel for which valid data exists. For a larger number of successive invalid pixel data, a warning might be triggered to alert the operator while at the same time continuing the image processing with substitution of valid data from a nearby pixel. For an even larger number of invalid data pixels which occur with a system failure, the warning expressly indicating system failure is issued and the scanning system shut down pending location and repair of the system failure.

DETAILED DESCRIPTION

Figure 1:
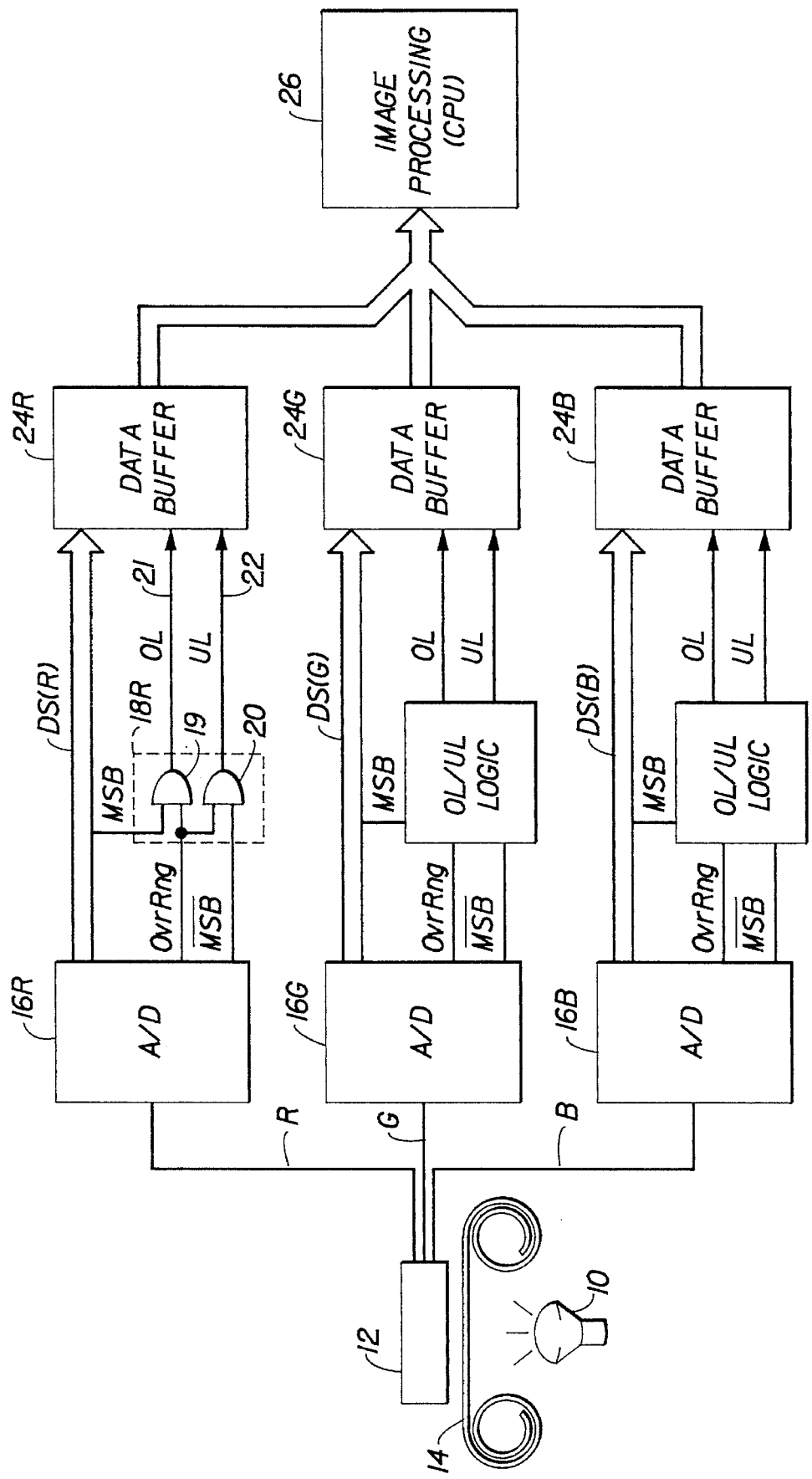
FIG. 1 is a functional schematic drawing of a portion of a photographic printing system embodying signal processing apparatus of the present invention.

Referring now to FIG. 1, light source 10 and light sensor 12 represent a film image scanner for deriving analog signals from successive pixels of an image scan performed on a negative film strip 14. The illustrated light sensor 12 is preferably a solid state CCD scanner of known construction and operation with spectral filtration to produce separate red, green and blue representative signals for each pixel of the scanned image frame. The signals from sensor 18 are normally converted by logarithmic amplifiers (not shown) into density representative signals. Following this, they are applied as analog input signals to separate A/D converters 16R, 16G, 16B where they are converted from analog signals to digital signals comprised of an image pixel data set "DS" having a most significant bit position "MSB". The converter also generates two additional signals to be employed in the signal processing apparatus of the invention. The first is an over range signal "OvrRng" indicative of the existence of an input analog signal value that is outside the conversion range of the A/D converter circuit. The conversion range is defined by an upper limit typically established by a positive reference voltage applied to the converter and by a lower limit established by a negative reference voltage. The second signal is a "most significant bit not" signal "$\overline{MSB}$" which is the inverted most significant bit of the data set DS.

Each of the R,G,B data processing channels includes a logic circuit 18R, 18G, 18B, respectively. Each logic circuit is comprised of a pair of AND circuits 19, 20, as illustrated for the red channel. The OvrRng signal is applied to a first input of both AND circuits and the MSB signal from the data set DS is applied to the second input of AND circuit 19 while the $\overline{\text{MSB}}$ signal is applied to the second leg of AND circuit 20. The logic circuits are effective to decode two out-of-range logic conditions, the first being an over limit condition "OL" and the second being an under limit condition "UL". The OL condition, represented by a high bit on line 21, indicates that the analog input voltage to the A/D converter is greater than the acceptable maximum input voltage. The UL condition represented by a high bit on line 22 indicates an input analog voltage that is lower than the acceptable minimum input. Low bits on both lines 21 and 22 are indicative of the fact that the input analog voltage for the associated pixel is within the A/D acceptable conversion range and thus the associated data set DS represents valid data for that pixel.

The digital data DS(R), DS(G), DS(B) for each channel is applied via intermediate data buffers 24R, 24G, 24B to an image processing computer 26 for suitable processing such as exposure determination or image manipulation. Along with the digital data set DS for each pixel, the associated OL and UL bits are applied to image processing computer 26 via the data buffers. The computer 26 is programmed to examine the OL and UL bits for each pixel to determine the acceptability of the digital data for that pixel. If either of these two bits is set to high, the computer will reject that pixel's data set and will not use it in the computer's image processing or image manipulation calculation. Instead, the computer program retrieves an adjacent valid pixel's data set in place of the invalid data. This process ensures that pixel data that has been adversely affected by aberrations, such as electrical noise, holes in the film, or opaque dirt particles on the film or sensor, will not be used in the computer calculations and that usable data is substituted therefor.

The availability of the distinction between over and under limit conditions allows the signal processing apparatus to provide appropriate warnings to the operator that can be highly useful in diagnosing and simplifying correction of the problems encountered. For example, a significant predetermined quantity of over limit OL indications in the image will cause the computer to flag a warning that would indicate such conditions as broken or damaged film, an electronic failure causing increased signal level to the A/D converter or significant increase in electronic noise in the scanner system. A significant predetermined quantity of under limit UL indications will cause the computer to flag a warning that would indicate such conditions as opaque dirt particles on either the film or sensor, other blockage in the optical path, failure of a pixel in the CCD sensor or broken or disconnected wires.

Figure 2:
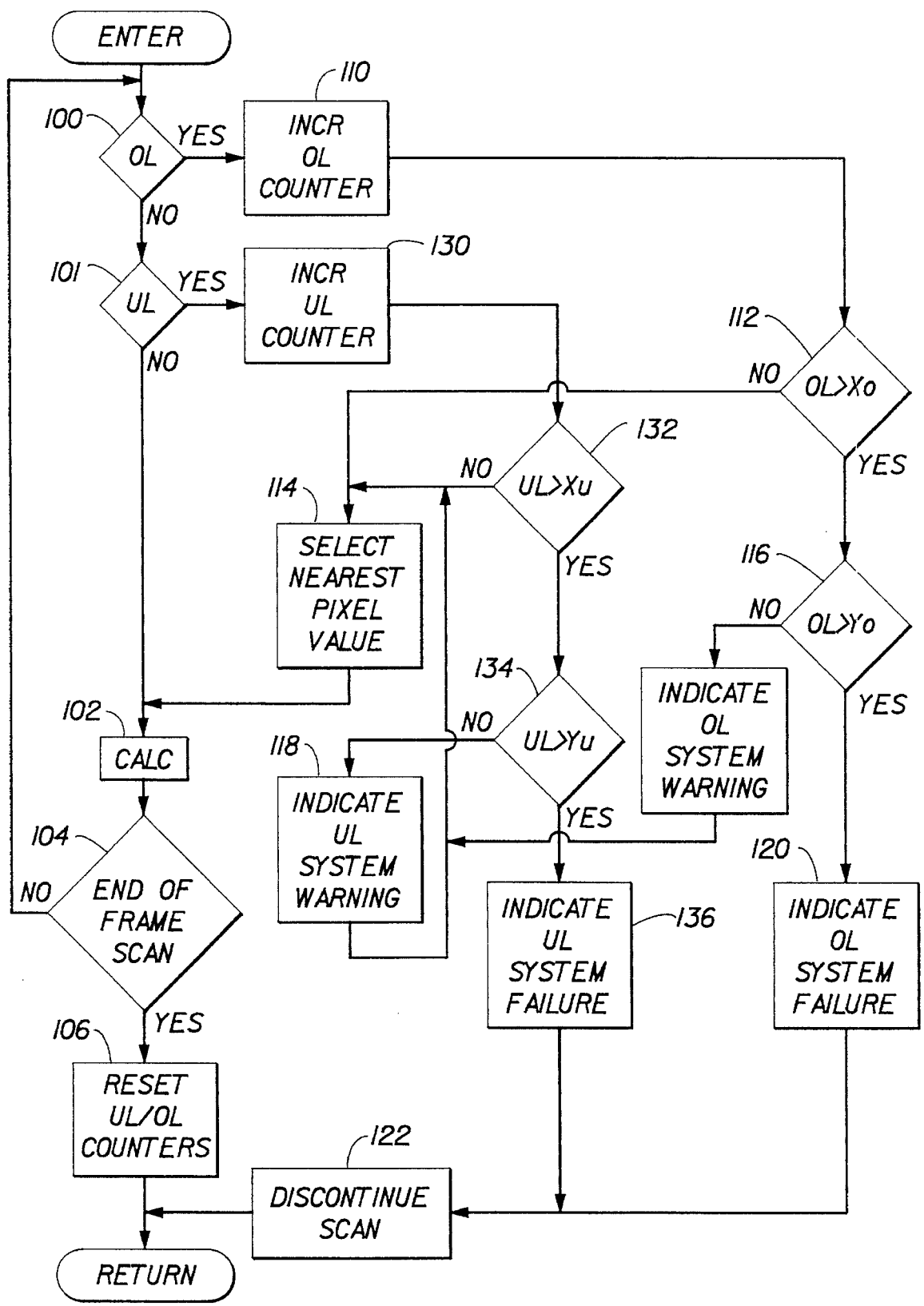
FIG. 2 is a simplified program flow chart illustrating the operation of an image processing computer in the signal processing apparatus of the present invention.

Referring to FIG. 2, there is shown a simplified program flow chart illustrating the manner in which computer 24 may be programmed to selectively respond to the over limit and under limit conditions to discriminate between various scanner problems and provide suitable operation and warnings appropriate to each of the problems. Thus, for each of the pixel data sets DS(R), DS(G), DS(B) transferred to the computer, an initial enquiries 100, 101 determine if there is an associated UL or OL bit that is set to a high condition. If no such bits accompany the data set, the program proceeds to normal algorithm calculation operation at step 102. The process is then repeated for the next pixel and so on until enquiry 104 determines that scanning of the image frame has been completed whereupon counter used to accumulate the number of OL and UL occurrences for the scanned frame are reset at step 106 and the computer waits for data from the next image frame scan.

Assuming that initial enquiry 100 detects a high condition exists in the OL logic condition, the OL accumulating counter is incremented at step 110 to accumulate the successive number of occurrences of over limit invalid pixel data. Enquiry 112 then determines if the cumulative number of successive OL logic conditions for the frame being scanned exceeds a first threshold level "$X_o$". If not, the assumption is that a minor defect in the scan has occurred, such as a minute dust speck on the film or an instantaneous electrical noise spike. In this event, step 114 rejects the current pixel data set DS, causes the nearest available valid pixel data set to be retrieved from the computer RAM memory and substitutes this data for calculation at step 102. If however, the OL invalid pixel count exceeds level "$X_o$" but is below a higher threshold level "$Y_o$", as determined by enquiry 116, the assumption is that a more serious condition may exist that may require operator attention but may not be serious enough to interrupt scan operation. In this event, step 118 causes a warning to be initiated, such as a warning light or an audible indicator, and the process continues with step 144 substituting a nearby valid pixel data set for calculation purposes. If the number of OL logic condition occurrences is determined by enquiry 116 to exceed this upper threshold "$Y_o$", the assumption now is that a serious system failure has occurred such as a broken film strip that requires immediate attention and correction. In this event, step 120 initiates a system failure warning and step 122 discontinues scanning and turns the system off to prevent continued operation. In a similar vein, if enquiry 101 determines that a UL logic condition exists, the program branches to step 130 to increment the accumulating UL counter following which enquiries perform the same discriminations for thresholds "$X_u$" and "$Y_u$" to determine the appropriate selection of step 114, 118 or 136, the latter providing a UL system failure indication and shutdown similar to the action of OL system failure indication step 120.

It will be appreciated that what has been described is a simple and effective method and apparatus for determining the existence of invalid pixel data in the scanning of negative films which allows for appropriate modification of an image processing operation. The invention has been described in detail with particular reference to a presently preferred embodiment, but it will be understood that variations and modifications can be effected within the scope of the invention as set forth in the claims appended hereto.

What is claimed is:

1. Signal processing apparatus for a photographic film scanner comprising:

an image sensor for deriving analog signals from successive pixels of an image scan;

an analog-to-digital converter for converting the analog signals into digital information comprised of (a) an image pixel data set representative of the analog signal value, the data set having a most significant bit position, and (b) an over-range signal representative of the existence of an analog signal value that is outside the conversion range of the analog-to-digital converter bounded by an under limit value and an over limit value;

a logic circuit responsive to the most significant bit position of the data set and to the over-range signal for generating a first logic condition indicative of an analog value lower than the under limit value of the conversion range and a second logic condition indicative of an analog value higher than the over limit value of the conversion range; and an image processing computer responsive to said logic conditions for processing the image pixel data sets in a predetermined manner depending on the logic condition indication for each corresponding image pixel data set.

2. Signal processing apparatus according to claim 1 wherein said image processing computer performs print exposure calculations from said image pixel data sets and is responsive to either one of said logic conditions associated with a particular data set having an analog value outside said conversion range to ignore said particular data set for image exposure calculation and to substitute therefor a pixel data set from a nearby image pixel which has an analog value within said conversion range.

3. Signal processing apparatus according to claim 1 wherein said image processing computer performs print exposure calculations from said image pixel data sets and is responsive to either one of said logic conditions associated with data sets having analog values outside said conversion range to accumulate the number of successive occurrences of out-of-range analog values and issue a warning when the number of cumulative successive occurrences is greater than a first predetermined number of occurrences but less than a higher second number of occurrences while, at the same time, allowing exposure calculation using data sets from nearby image pixels having analog values within said conversion range.

4. Signal processing apparatus according to claim 3 wherein said image processing apparatus is effective when said cumulative successive number of occurrences exceeds said higher second number of occurrences to issue a warning indicating a system failure and to discontinue further exposure calculation.

* * * * *